Feb. 28, 1928.

C. G. TERRY 1,660,689

HEATING AND VENTILATING DEVICE

Filed March 30, 1927    2 Sheets-Sheet 1

INVENTOR.
CLEVELAND G. TERRY.
BY
ATTORNEY

Feb. 28, 1928.

C. G. TERRY 1,660,689

HEATING AND VENTILATING DEVICE

Filed March 30, 1927    2 Sheets-Sheet 2

INVENTOR.
CLEVELAND G. TERRY.
BY
ATTORNEY

Patented Feb. 28, 1928.

1,660,689

UNITED STATES PATENT OFFICE.

CLEVELAND G. TERRY, OF TUJUNGA, CALIFORNIA.

HEATING AND VENTILATING DEVICE.

Application filed March 30, 1927. Serial No. 179,473.

This invention relates to a means for supplying fresh air, either heated or of normal atmospheric temperatures, to closed areas and for simultaneously removing impure air from said closed areas whereby a circulation of fresh air and thorough ventilation of such closed areas may be continuously effected.

The invention relates particularly to an improvement in that type of heating apparatus more specifically disclosed, explained and claimed in my co-pending application for patent filed September 9, 1925, Serial Number 59,284.

In contradistinction to the heater disclosed in said application, which is a heating unit for an individual or single area, this invention relates to a apparatus for heating and ventilating a number of closed areas or for supplying fresh heated air at a number of places in a single area where the size of same makes this necessary, and the object of this invention is to provide a simple and compact apparatus which will constitute a central heating unit for a number of closed areas or spaces; in which a gaseous fuel is arranged to be used; to provide apparatus of this character in which no fumes or gases can escape into the closed area or areas; and to provide a heating apparatus by which pure fresh air may be delivered into and circulated in rooms or other enclosures and heated to a degree that will provide a comfortable atmosphere without over heating or drying.

Other objects of the invention will appear from the specification following in connection with the accompanying drawings, which illustrate a practical and convenient form of embodiment of the invention and in which Fig. 1 is a sectional elevation of a heating unit embodying the invention.

Figure 1:
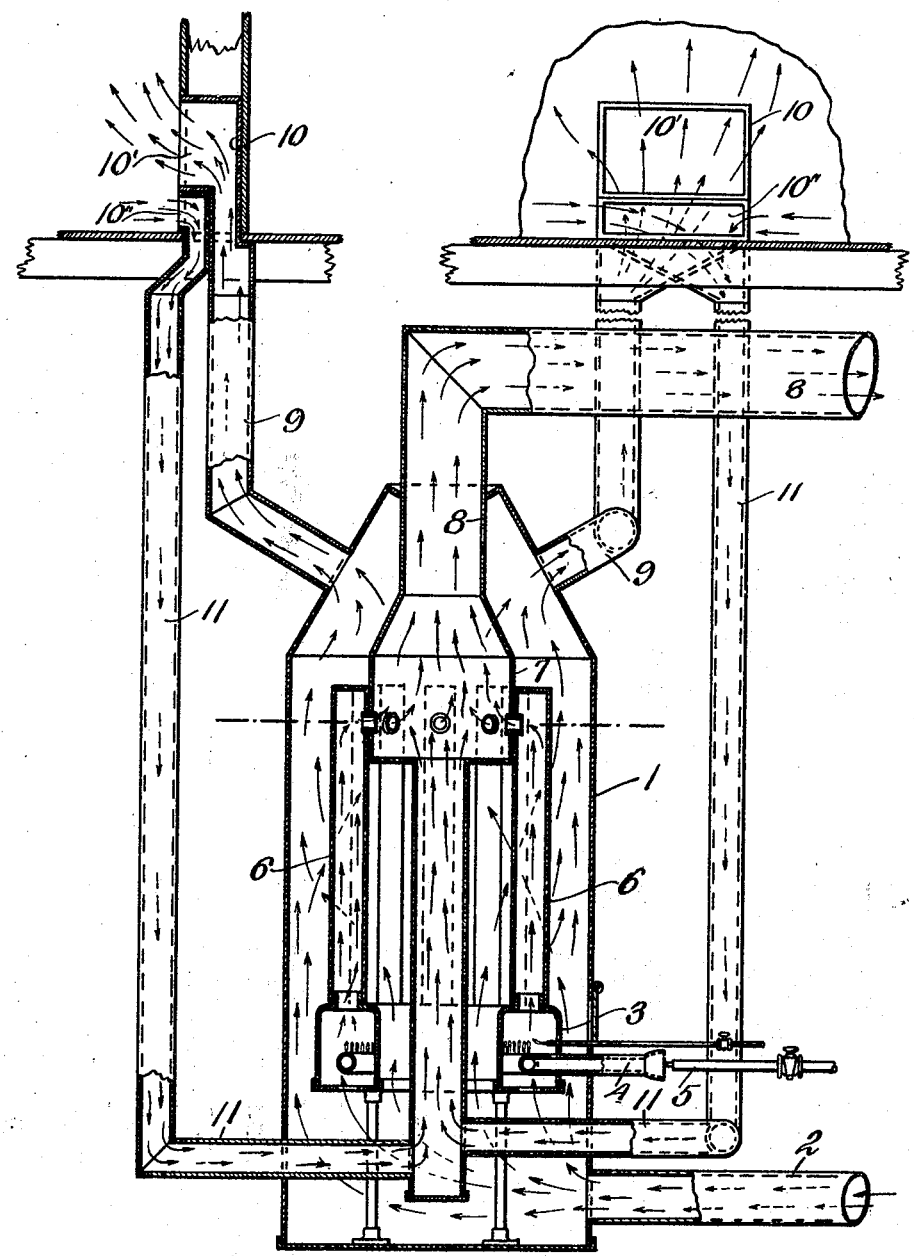
Figure 2:
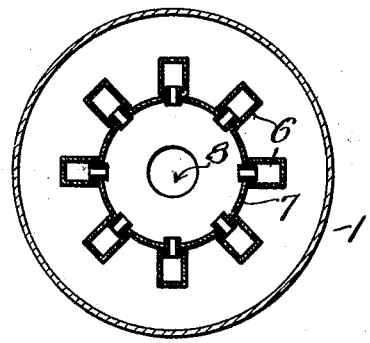
Fig. 2 is a horizontal section on line 2—2, Fig. 1.
Figure 3:
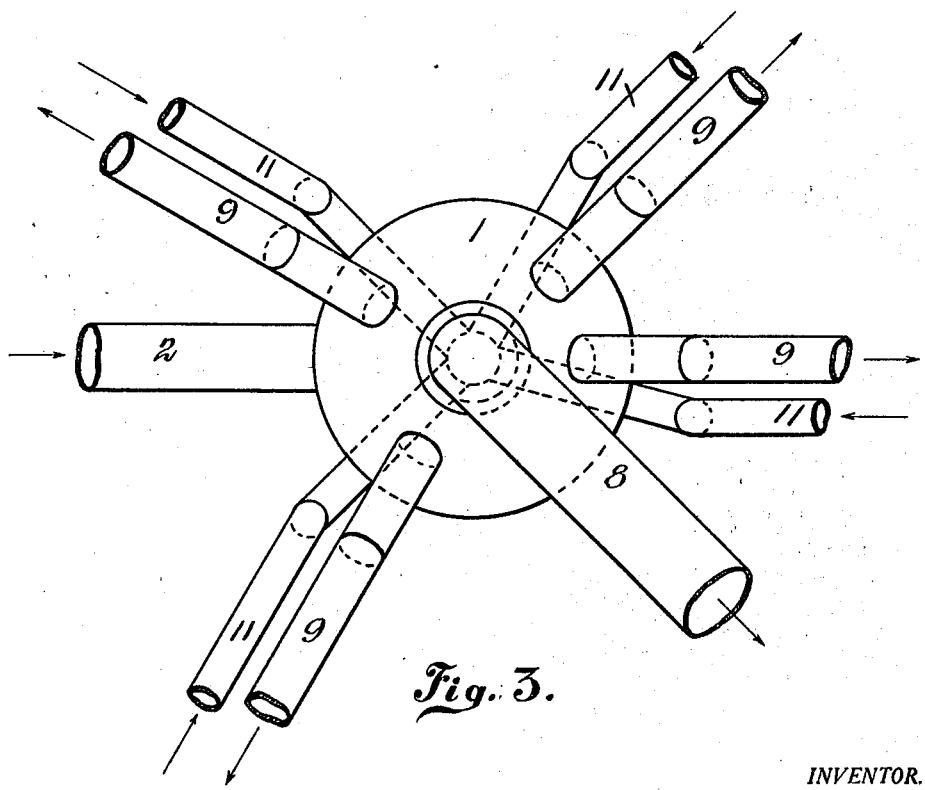
Fig. 3 is a top plan view showing an arrangement of the fresh air inlet pipe, the heated air conveying pipes, and the used or impure air return pipes.

The invention consists of an apparatus for heating the outside air, conveying the heated air to a number of closed but separate areas or rooms, which may be located on different floors of a building, and for removing the used or impure air from the areas or rooms by returning it to the apparatus and from there causing its exit, with the flue gases to the outside air. The apparatus is arranged at a most convenient central point from which the distribution of the heated air and the withdrawal from the closed areas of the stale or vitiated air may be readily effected.

In the form of embodiment of the invention shown in the drawings, 1 indicates a heating chamber, which for convenience and cheapness of manufacture is of cylindrical shape, and is preferably cone shaped at the top. The heating chamber 1 is in direct communication with the atmosphere, preferably through the medium of a conduit 2 through which the outside air may freely enter into the heating chamber 1.

Suitably supported within the heating chamber 1, and spaced from the walls thereof, is a ring chamber 3 in which is disposed a burner 4, supplied with a gaseous fuel from a suitable source, through pipe 5. The hot gases of combustion are conveyed from said ring chamber 3 upwardly through a plurality of pipes 6, which at their upper ends are in communication with the enlarged portion 7, of a stack 8 centrally disposed within and extending to near the bottom of said heating chamber 1, the stack 8 being closed at the bottom. By means of said stack 8 the combustion gases entering said enlarged portion 7 of the combustion ring chamber 3 through the interconnecting pipes 6, are led to the outside. The outside air inflowing through conduit 2 into the heating chamber 1, is heated by contact with the combustion ring chamber 3 and the pipes 6 connected therewith and, when so heated, is led off from the chamber 1, through a plurality of flues 9 into areas to be heated, through means disposed in said areas and which means may comprise registers 10 as shown having heated air inlets 10′ and used or stale air exits 10″, or any other devices or arrangement by which the heated fresh air may enter closed areas and the used or stale heated air may be removed from the closed areas continuously. The stale or used heated air, under the stack energy, is removed from the closed areas through the register exits 10″, through flues 11, which connect directly and communicate with the stack 8 near the bottom closed end thereof and, as seen in Fig. 1, below the point of entrance thereinto of the gases of combustion from the ring chamber 3, whereby the stale or used air is removed from closed areas by the stack draft. As seen in Fig. 1, the lower part of the stack 8, extends through and below the ring chamber 3 and is spaced therefrom to allow free circulation thereabout of the incoming outside air. The disposition of the stack 8 through this ring chamber exposes the stack to the heat of the combustion chamber 3, whereby the stack temperature is augmented and the stack energy increased. In operation, the outside air enters the chamber 1, and after being heated by passing over and in contact with the ring chamber 3 and the pipes 6, is conveyed through flues 9 into the areas to be heated through the inlet openings 10′ of the devices 10 disposed in such areas. Simultaneously with the entry of the heated air into the areas, substantially an equivalent quantity of the air in such areas is continuously withdrawn therefrom by the stack draft, such air leaving the areas through the openings 10″ in the devices 10, and, traveling through flues 11, enters the stack 8 at the bottom, by reason of which it is continuously exhausted to the outside. In this wise, a continuous circulation of heated air and a continuous ventilation of all areas is effected.

What I claim, is:

1. A heating and ventilating device comprising a heating chamber, means for conveying the outside air to said chamber, a stack extending centrally into said chamber and to near the bottom thereof, the bottom of said stack being closed and the top of said stack communicating with the outside, a circular heating chamber surrounding said stack, a gaseous fuel burner within the chamber, a plurality of pipes connected with said heat chamber and with and above the bottom of said stack, a plurality of flues connected to the top of said chamber to lead off the heated air to different areas, and a plurality of flues to connect said areas with said stack to carry out from said areas the used or stale air.

2. A heating and ventilating device comprising a heating chamber, means for conveying the outside air to said chamber, a ring chamber disposed centrally of and within said heating chamber, means within said ring chamber for burning a gaseous fuel, a plurality of upstanding pipes connected with said ring chamber to convey the hot gas of combustion therefrom, a stack disposed centrally of said chamber and through but spaced from said ring chamber, the bottom of said stack being closed, and the top thereof open to the outside air, said pipes connected and communicating with said stack near the top of said heating chamber, a plurality of flues for leading off the heated air to different areas, and a plurality of flues to connect said areas with said stack to carry off from said areas the used or stale air.

3. A heating and ventilating device comprising a chamber, a means connecting said chamber with the outside air, a stack extending vertically through said chamber to near the bottom thereof, and open at the top and closed at the bottom, a heating chamber surrounding said stack, a burner within said heating chamber, upstanding pipes connecting said heating chamber with said stack near the top of said chamber, a plurality of flues connected with the top of said chamber to convey heated air to closed areas and a plurality of flues connected with said stack near the bottom thereof to lead off air continuously from such closed areas.

4. A heating and ventilating device comprising a heat chamber, a means connecting said chamber with the outside air, a stack vertically disposed within said heat chamber and having its lower end closed and near the bottom of said heat chamber, and the other end of said stack being open to the outside, said stack formed with an enlarged portion near the top of the heat chamber, a means for supplying heat to said heat chamber, comprising a ring chamber surrounding said stack and containing a burner, pipes upstanding from said ring chamber and connected with said enlarged portion of said stack to convey the combustion gases from said ring chamber to said enlarged portion, flues connected to the top of said heat chamber to convey heated air to closed areas, and flues to lead from said closed areas and connected with said stack near the bottom thereof to remove the air from said closed areas and pass it to the outside through the stack.

5. A heating and ventilating device comprising a heat chamber, a conduit connected at the bottom thereof for leading thereinto the outside air, a stack within and extending through the top of said chamber, the bottom of said stack being closed and extending to near the bottom of said heat chamber, and the top of said stack being in open communication with the outside air, said stack having an enlarged portion near the top of said heat chamber, a heating means within said chamber, comprising a ring chamber surrounding and spaced from said stack, a plurality of circularly arranged pipes on said ring chamber and in communication with said enlarged portion of the stack, a plurality of flues connected with the top of said heat chamber to convey heated air to closed areas, and a plurality of flues to communicate with said closed areas and directly connected with said stack below said ring chamber to cause the stack draft to remove air from said closed areas continuously.

In testimony whereof I have set my hand.

CLEVELAND G. TERRY.